United States Patent
Davis et al.

(10) Patent No.: US 6,218,602 B1
(45) Date of Patent: Apr. 17, 2001

(54) INTEGRATED ADAPTOR MODULE

(75) Inventors: Lanny Davis, Columbia, SC (US); Robert D. Lawson, Des Moines, IA (US); Lance E. Lyda, Houston, TX (US); Jay S. Siekmann, Knoxville, TN (US)

(73) Assignee: Van Koevering Company, Des Moines, IA (US)

( * ) Notice: Subject to any disclaimer, the term of this patent is extended or adjusted under 35 U.S.C. 154(b) by 0 days.

(21) Appl. No.: 09/288,740

(22) Filed: Apr. 8, 1999

Related U.S. Application Data

(63) Continuation-in-part of application No. 09/237,150, filed on Jan. 25, 1999.

(51) Int. Cl.⁷ .................................................. G09B 15/02
(52) U.S. Cl. ......................... 84/477 R; 84/600; 84/719; 84/478
(58) Field of Search ............................ 84/610, 634, 645, 84/650, 666, 477 R, 478, 600–602, 718–719

(56) References Cited

U.S. PATENT DOCUMENTS

| | | |
|---|---|---|
| 4,624,171 | 11/1986 | Yuzawa et al. . |
| 4,881,440 | 11/1989 | Kakizaki . |
| 4,960,031 | 10/1990 | Farrand . |
| 5,027,689 | 7/1991 | Fujimori . |
| 5,046,004 | 9/1991 | Tsumura . |
| 5,054,359 | 10/1991 | Hikawa . |
| 5,085,116 | 2/1992 | Nakata et al. . |
| 5,092,216 | 3/1992 | Wadhams . |
| 5,138,925 | 8/1992 | Koguchi et al. . |
| 5,142,961 | 9/1992 | Paroutaud . |
| 5,146,833 | 9/1992 | Lui . |
| 5,174,759 | 12/1992 | Preston et al. . |
| 5,220,117 | 6/1993 | Yamada et al. . |
| 5,225,618 | 7/1993 | Wadhams . |
| 5,252,775 | 10/1993 | Urano . |
| 5,262,580 | 11/1993 | Tamaka . |
| 5,270,475 | 12/1993 | Weiss et al. . |
| 5,274,779 | 12/1993 | Stewart et al. . |
| 5,286,908 | 2/1994 | Junglieb . |
| 5,296,641 | 3/1994 | Steizel . |
| 5,298,675 | 3/1994 | Nishimoto et al. . |
| 5,300,723 | 4/1994 | Ito . |
| 5,300,725 | 4/1994 | Manabe . |
| 5,331,111 | 7/1994 | O'Connell . |
| 5,355,762 | 10/1994 | Tabata . |
| 5,389,729 | 2/1995 | Hiramatsu . |
| 5,391,827 | 2/1995 | Koyama . |
| 5,393,926 | 2/1995 | Johnson . |
| 5,398,278 | 3/1995 | Brotz . |
| 5,410,100 | 4/1995 | Kim . |
| 5,410,941 | 5/1995 | Hotta et al. . |
| 5,416,526 | 5/1995 | Yamamoto . |
| 5,499,921 | 3/1996 | Sone . |
| 5,512,707 | 4/1996 | Ohshima . |
| 5,559,301 | 9/1996 | Bryan, Jr. et al. . |
| 5,646,362 | 7/1997 | Koyama et al. . |
| 5,665,927 | 9/1997 | Taki et al. . |
| 5,728,960 | 3/1998 | Sitrick . |
| 5,792,971 | * 8/1998 | Timis et al. ............................ 84/609 |
| 5,949,012 | * 9/1999 | Ishii ...................... 84/615 |

* cited by examiner

*Primary Examiner*—Paul Ip
*Assistant Examiner*—Marlon T. Fletcher
(74) *Attorney, Agent, or Firm*—Senterfitt Akerman

(57) ABSTRACT

An adaptor module includes a graphical user interface having a video display and a touch responsive overlay. The graphical user interface displays graphical images representing parameters of an electronic musical instrument and generating control signals. A computer system is also included in the adaptor module for driving the graphical user interface. A music stand for supporting sheet material, wherein the graphical user interface forms part of the music stand. The graphical user interface can be mounted in an opening in the music stand and can provide a touch screen that is flush with the music support surface or recessed. The computer system is adapted for receiving signals from the electronic musical instrument.

30 Claims, 19 Drawing Sheets

FIG. 12
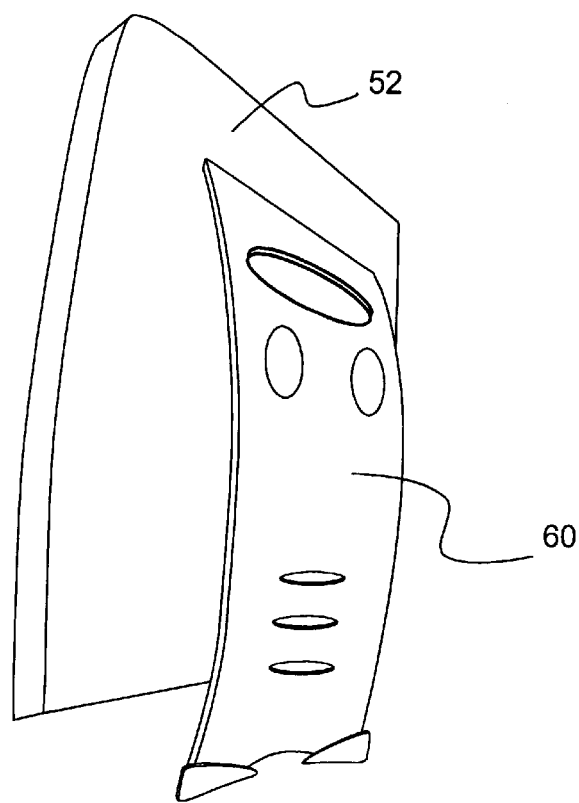
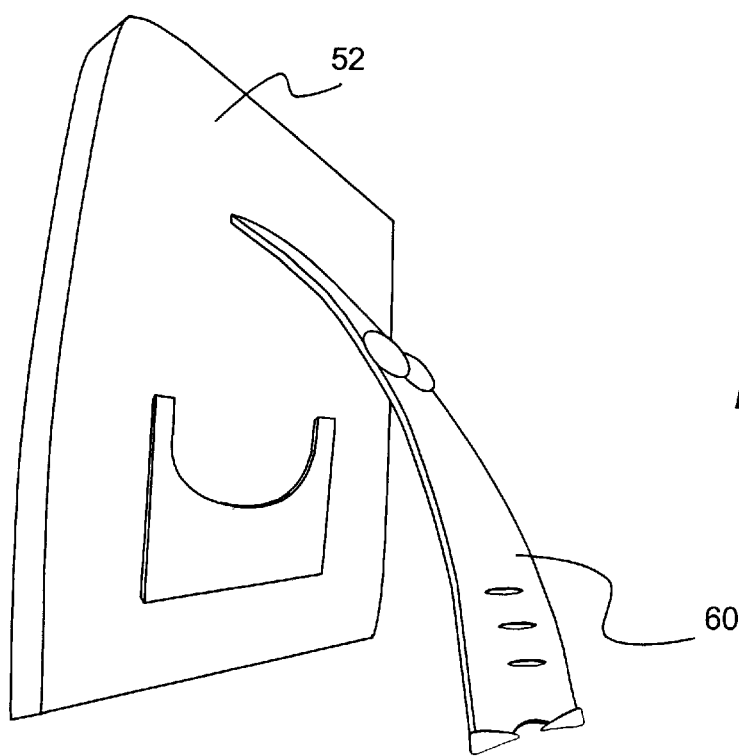
FIG. 13

INTEGRATED ADAPTOR MODULE

CROSS REFERENCE TO RELATED APPLICATIONS

This application is a Continuation-In-Part of U.S. application Ser. No. 09/237,150, filed Jan. 25, 1999.

STATEMENT REGARDING FEDERALLY SPONSORED RESEARCH OR DELVELOPMENT (Not Applicable)

FIELD OF THE INVENTION

The invention relates to electronic music instruments. The invention more particularly relates to a computer-based control system and adaptor for electronic instruments.

BACKGROUND OF THE INVENTION

A variety of electronic musical instruments, particularly electronic keyboards, use microprocessor based computer systems to provide additional features and advantages. These computer-assisted musical instruments are often attached to some type of electronic display, typically either a CRT or LCD, to present graphical information generated by the computer to the user. The information has included such things as status and function configuration information for the electronic instrument or educational information, such as musical scores to assist the user in playing or otherwise using the associated musical instrument. Many computer-assisted musical instruments have utilized MIDI (Musical Instrument Digital Interface) protocol to process musical instrument inputs for the emulation of musical sound. This MIDI protocol is used by the various input and output sources to transfer information therebetween.

Resulting systems have interfaced with the user in one of two extremes. The systems either provide little or no interaction between the user and the underlying computer system, as in the case of consumer digital pianos, commonly used for player piano and recording functions, or are primarily intended for use by recording and performing professionals, utilizing complicated interfaces involving numerous buttons, knobs, switches and sliders. Other systems utilize complicated visual interfaces, making the features largely inaccessible to novice or consumer users and unmanageable for "real time" adjustment during performances by professional musicians.

Moreover, most systems incorporating computer-based management of a musical instrument have primarily focused on the operation of the musical instrument and have not incorporated the musical instrument and its sound production into a larger music information management environment that is readily accessible to both novices and performing musicians through a consolidated, rapidly accessible graphical user interface. Existing systems also do not provide a vehicle to launch multimedia applications from a consolidated graphical user interface for use in a musical instrument and multimedia music information environment.

One problem with existing systems is that users are required to obtain the whole system although they already possess one portion of the system. For example, a large number of electronic synthesizers or keyboards are currently being used without the aid of the computer-based control system. However, no device that includes the computer-based control system is available that can be combined with a stand-alone electronic musical instrument such as an electronic keyboard. Thus, instead of adding on one additional component to their current component, for example a stand-alone electronic keyboard, to complete the system, these users are required to acquire the system as a whole if they want to have the entire system, as described above. This problem is particular important to institutions, like schools, that have stand-alone musical instruments and would like to have the benefits provided by the above-mentioned computer-based control system but do not have the funds to purchase a complete system.

Another problem associated with bringing computer technology to the musical instrument environment is the arrangement of the computer display and associated inputs/outputs with the musical instrument. This combination of the display and input/outputs has not been integrated into an aesthetic housing. Further, the arrangement of input controls have not been ergonomically positioned for convenient use, particularly during actual performance on the instrument while maintaining traditional aesthetics.

SUMMARY OF THE INVENTION

It is therefore an object of the invention to integrate a music stand and a computer display into an adaptor module that can be used as a retrofit for an electronic musical instrument, for example an electronic keyboard.

It is another object of the invention to provide an integrated music stand and computer display in an aesthetic housing.

It is yet another object of the invention to provide an integrated music stand and computer display that is ergonomically positioned to be readily and naturally seen and touched in a location customary for viewing and touching in a piano environment.

It is still another object of the invention to provide an integrated music stand and computer display that can interface with an electronic instrument using MIDI protocol.

It is yet another object of the invention to provide a modular computer-based control system that can provide for the combination of housings for a graphical user interface, and associated computer-based control system electronics in housings that can readily be placed on a piano for convenient access by the user particularly during actual performances and further can provide as an option music stand functionality.

These and other objects of the invention are achieved by an adaptor module preferably having a graphical user interface including a video display and a touch responsive overlay which can form part of a music stand. The graphical user interface can be used to control a computer system within the adaptor module that is configured to provide any of a variety of functions, both known and yet to be developed.

The preferred integration of the graphical user interface in the music stand positions the touch control for such control functions as instrument sound selection and volume at the same location that a musician is accustomed to reaching to turn pages of sheet music. Thus, the hand motions are natural and readily made particularly during performances. Similarly, the video display projects images to the user at a level he is accustomed to viewing sheet music. Accordingly, the adaptor module of the invention provides touch screen control in an ergonomically and aesthetically optimal arrangement.

Alternative embodiments of the invention can provide for a flat frame-like graphical user interface housing that can conveniently be placed along the top surface of a piano or in fact mounted on an existing music stand. This modular graphical user interface housing can conveniently be positioned selectively along the existing music stand for convenient placement relative to other information, such as sheet music, being used by the player.

In alternative embodiments, the modular system can be provided by one or more components that are adapted to be placed or mounted onto an existing piano. These alternative embodiment components can include housing for containing the graphical user interface and touch screen overlay that is secured in a upright or angled position by a pivotal back support such as that found on the back of picture frames. This graphical user interface can further be mounted either removably or permanently to a generally flat and horizontal platform that can contain, for example, drives for the system, such as a floppy drive and a disk drive. The further embodiments can also include a larger housing for enclosing electronics for the musical instrument system and providing a forward mounting surface for receiving the housing of the graphical user interface and touch screen control. This larger housing can further be constructed to accommodate one or more music stand surfaces mounted to the left and right of the larger housing and providing a continuous railing to form a base for the music stand. The housing of the graphical user interface and touch screen overlay can be adapted to slidably mount to this railing so as to be selectively positioned at a variety of the locations along the music stand railing.

By use of the adaptor module, a user of any stand-alone electronic musical instrument, an electronic keyboard for example, can combine the electronic keyboard and the adaptor to obtain the additional features and benefits provided by the computer system. Thus, instead of purchasing a complete system that includes the instrument, the graphical user interface, and the computer system, the user is only required to retrofit the existing instrument with the adaptor module.

BRIEF DESCRIPTION OF THE DRAWINGS

There are shown in the drawings embodiments of the invention that are presently preferred, it being understood, however, that the invention is not limited to the precise arrangements and instrumentalities shown, wherein:

FIG. 12 is a rear perspective view as in FIG. 11 with the pivotal back support in a closed position;

FIG. 13 is a rear perspective view as in FIG. 12 with the back support pivoted to an open supporting position;

DETAILED DESCRIPTION OF PREFERRED EMBODIMENTS

The invention is directed to a computer-based music information management system as an adaptor module to process and produce sound and other music information from a plurality of sources that can be positioned in the traditional location of a music stand and preferably modularly from the music stand. A video monitor with a touch screen preferably provides the user with an interface to a computer system. The video monitor is preferably ergonomically and aesthetically housed within a music stand system. The adaptor module is preferably intended to be retrofitted for use with existing electronic musical instruments.

Generally, the invention provides the convergence and integration of various subsystems to arrive at an interactive system for upgrading a musical instrument. The system preferably creates a user-friendly environment, established by a consolidated, touch screen control interface.

The preferred embodiments of the invention provide a multimedia platform, including components for presenting full motion digital video, animation, multi-colors, high resolution graphics, and digital audio. The software drivers for the musical instrument system preferably present motion picture through the MPEG-1 standard of 30 frames per second to provide full motion digital video.

The computer system preferably includes a storage subsystem comprising 720 megabytes through an optical disk, 500 megabytes or more in a hard drive, and 1.44 megabytes on floppy disk. The optical disk and associated drivers enable use of compact discs in a variety of formats, including DVD and CD-ROM.

The computer system preferably utilizes MIDI (Musical Instrument Digital Interface) standard protocol for communications between itself and a musical instrument having a MIDI sound generator, as well as for receipt and transmittal of music information between the various digital sources of the system. The MIDI sound generator can be contained within the musical instrument, or alternatively, the MIDI sound generator can be external to the music instrument so as to convert the sound produced by the instrument into data conforming to the MIDI protocol. Although the system preferably uses the MIDI protocol, this invention can be used with any protocol used to transfer sound information as digital data.

Figure 1:
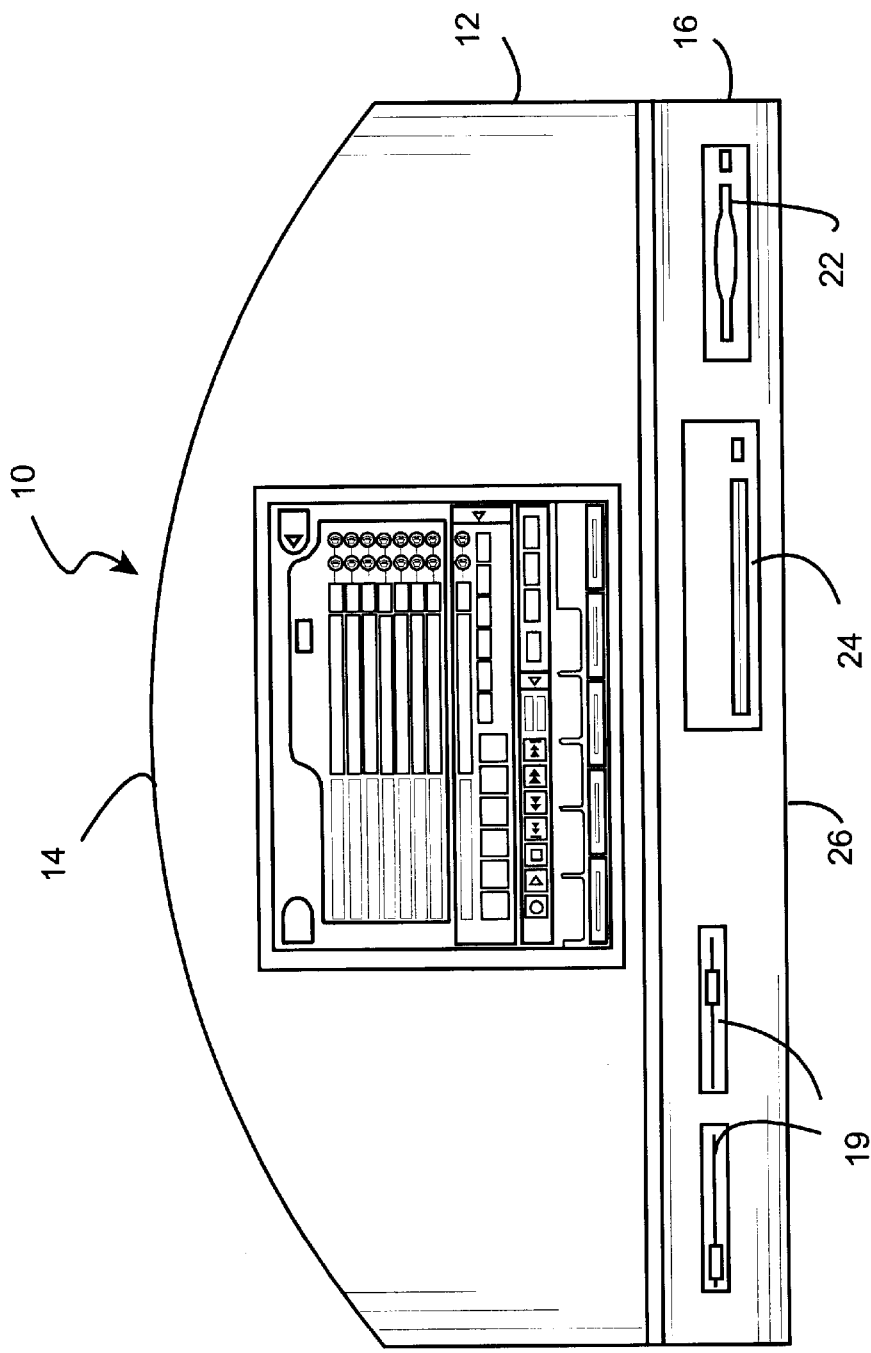
FIG. 1 is a front elevation of an adaptor module according to the invention.

Referring to the figures and particularly to FIG. 1, an embodiment of the adaptor module and display 10 can generally include a music stand 12, a video output device 14, a computer system, not shown, in a housing 16, and input/output devices. The input/output devices are for connecting to peripheral devices, and at least one of the input/output devices is for connection to an electronic musical instrument, for example an electronic musical keyboard.

Figure 2:
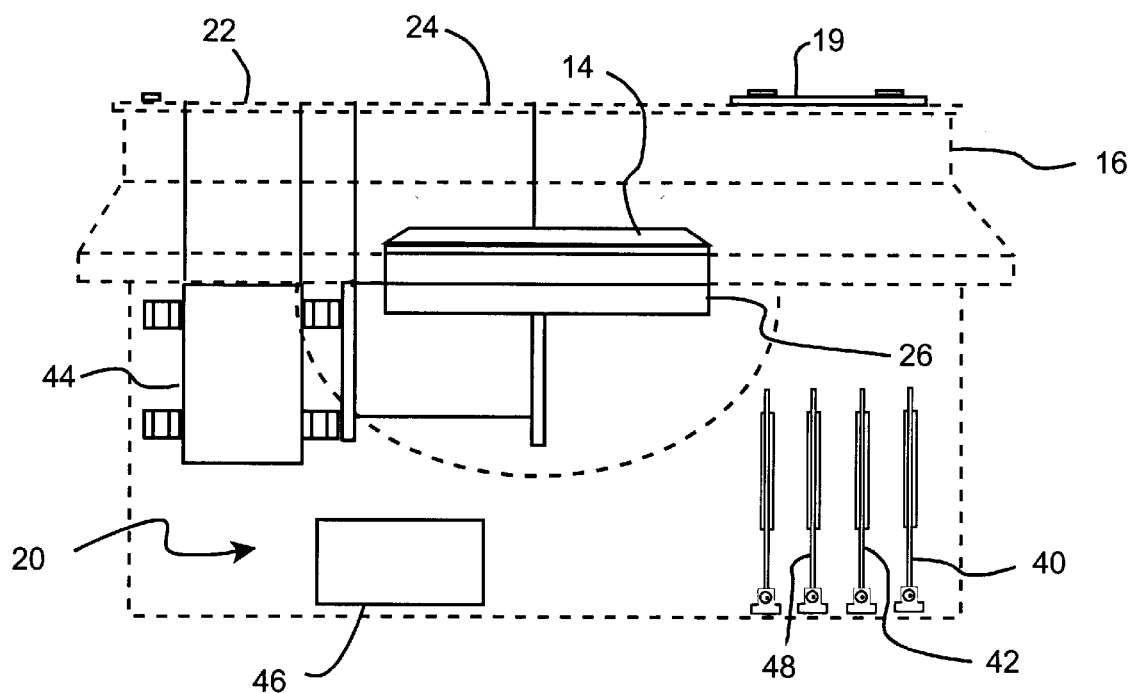
FIG. 2 is a partial top plan of FIG. 1.
Figure 3:
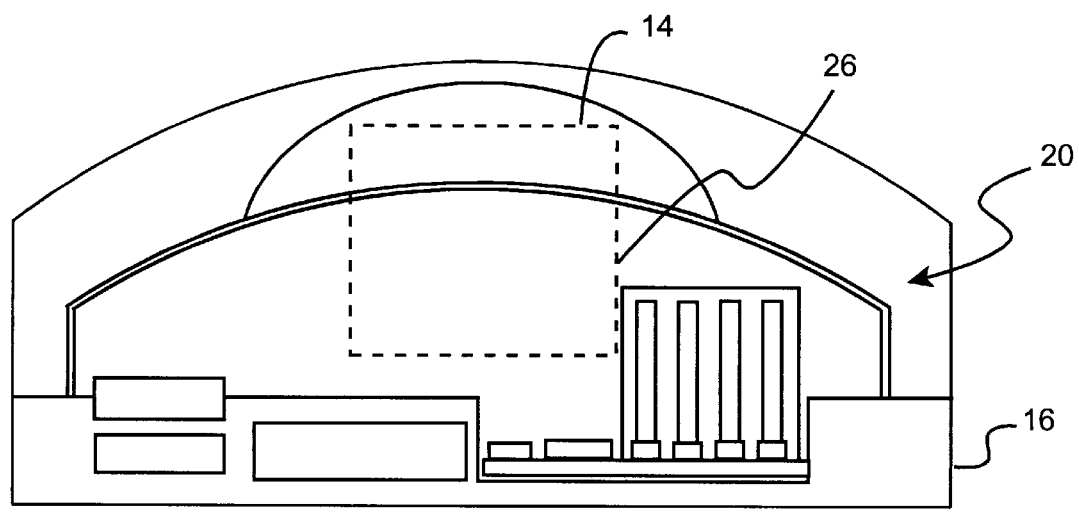
FIG. 3 is a partial rear elevation view of FIG. 1.

Referring to FIGS. 2 and 3, the computer system 20 receives information from and sends information to the video output device 14. Many devices are capable of transferring information from one computer component to another are known to those skilled in the art, and this invention is not limited as to any particular transfer device. The computer system 20 also receives information from an electronic musical device, not shown. As previously discussed, any type of device capable of transferring information is acceptable for use with this invention. However, the presently preferred input device is a PC card 40. The PC card 40 is preferably adapted to be connected to a cable that transfers data from the electronic musical device using the MIDI protocol. The computer system 20, the video output device 14, and input/output devices are also described in U.S. application Ser. No. 08/879,678, filed Jun. 23, 1997, which is incorporated herein by reference.

The computer system 20 preferably includes a plurality of digital information sources, examples of which include DVD drives and zip-drives. The presently preferred digital information sources are a floppy disk (FD) drive 22 for 3.5 inch disks and a CD-drive 24 for compact discs, each being enclosed in the housing 16. The computer system can further include a modem 42 for exchanging information with a variety of on-line sources. Through the on-line sources and the digital information sources, the computer system 20 can obtain information for performing a variety of functions previously available only through complicated or separate systems. The computer system 20 can also include outputs for devices such as a printer or headsets.

Although the computer system 20 preferably includes the above-identified preferred components, the computer system 20 can also include other components. Many types of components are used or can be used with computer systems 20 and all are acceptable with this invention. For example, the computer system 20 can additionally include a hard drive 44, a power supply 46, or a keyboard (not shown).

The adaptor module 10 is preferably connected to a sound system for providing an audio output. The sound system can be part of the electronic musical instrument, optionally integrated within the adaptor module 10, or separate from either the adaptor module 10 or the electronic musical instrument. A control 19 for various parameters, for example, the volume and balance, of the sound system can be located with the sound system, or as presently preferred located on the adaptor module 10.

If the sound system is to be separate from the adaptor module 10, the computer system 20 preferably includes an audio output 48 for sending information to the sound system. Audio outputs 48 capable of sending information to a sound system are known to those skilled in the art and any are acceptable. However, the presently preferred audio output 48 is an audio jack for a receiving an audio cable connected to the sound system.

The invention is not limited as to the means in which sound parameters and information retrieval and utilization are controlled. Many devices, for example a keyboard or mouse, are known by those skilled in the art as acceptable for this purpose. However, as illustrated in FIG. 1, the control of the sound parameter and information retrieval and utilization are preferably unified in a graphical user interface presented on a video monitor 14. The preferred video monitor 14 includes a flat screen display 26 that is preferably equipped with a touch control overlay for detecting and processing player input through relative position of contact with the overlay. The flat screen display 26 is preferably positioned flush within the music stand 12, although other mountings in the stand 12 are possible. The flat screen display 26 is preferably a Sharp Model No. LQ10D031 4-bit color LCD display. The touch control overlay can be provided in a variety of known constructions, such as the use of a 4 or 8 wire analog resistive panel controlled through a microprocessor and analog to digital converter.

Figure 4:
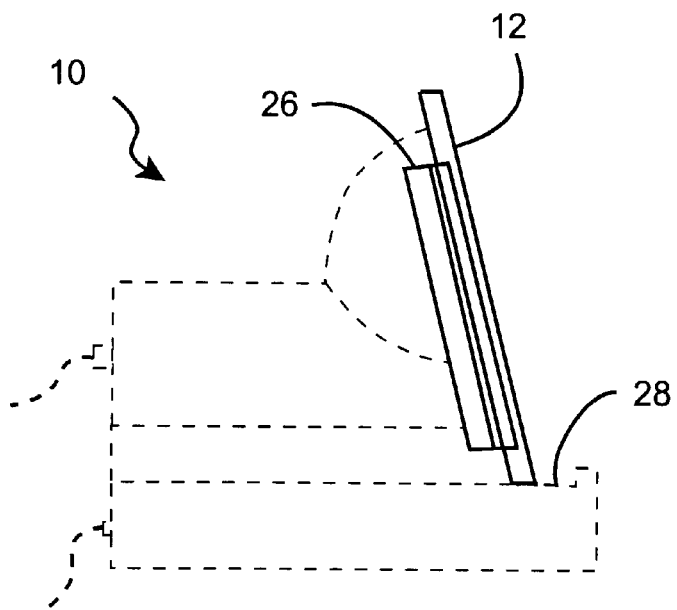
FIG. 4 is a partial side elevation of FIG. 1.
Figure 5:
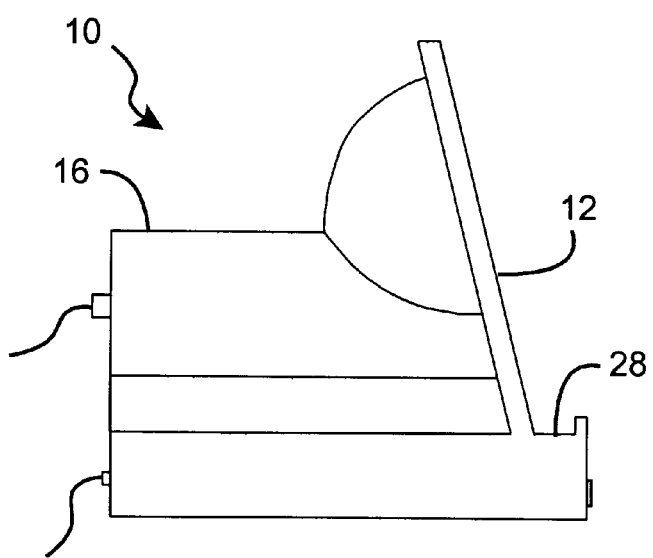
FIG. 5 is a side elevation of FIG. 1.

As illustrated in FIGS. 4 and 5, the music stand 12 can be formed from a flat board extending upwardly from a music rack base 28. The board preferably angles away from the user to provide an inclined surface for holding sheet music and the like. The sheet materials can rest directly against the base 28, which may also provide a groove for further security of the sheets. The board can be made of wood, plastic or other similarly suitable materials. The board can also be ornamental along its periphery in keeping with the style of the equipment with which it is to be used.

Figure 6:
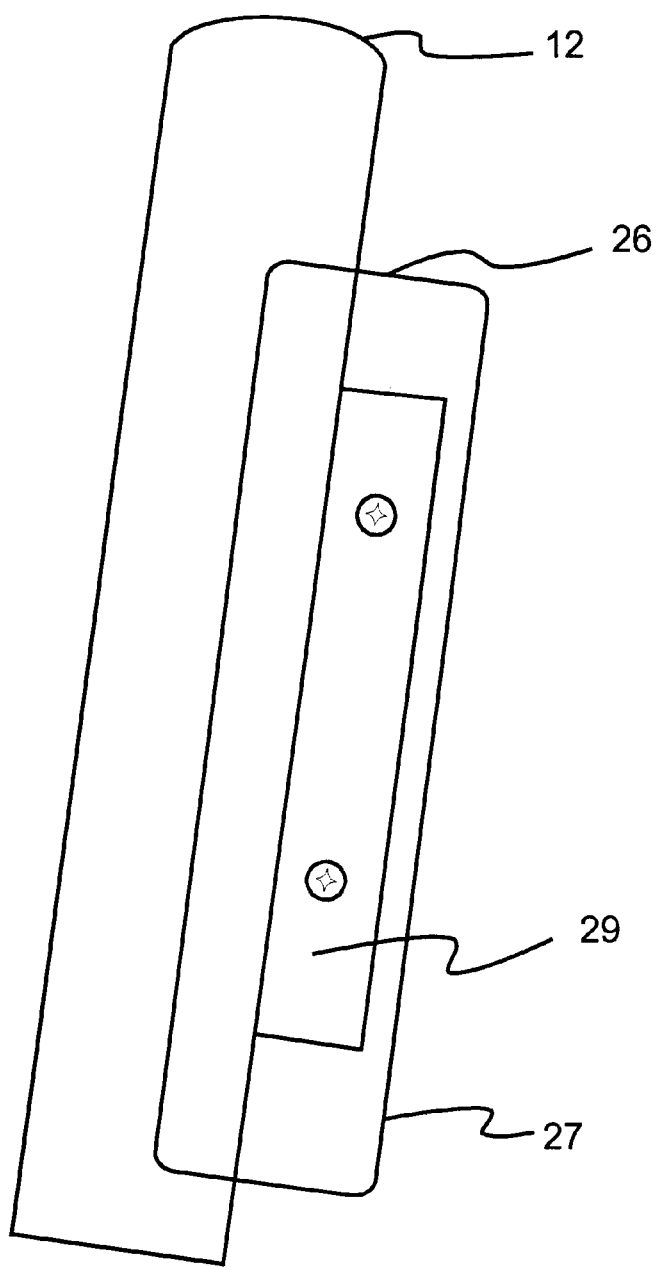
FIG. 6 is a partial side elevation of a music rack shown in FIG. 1.
Figure 7:
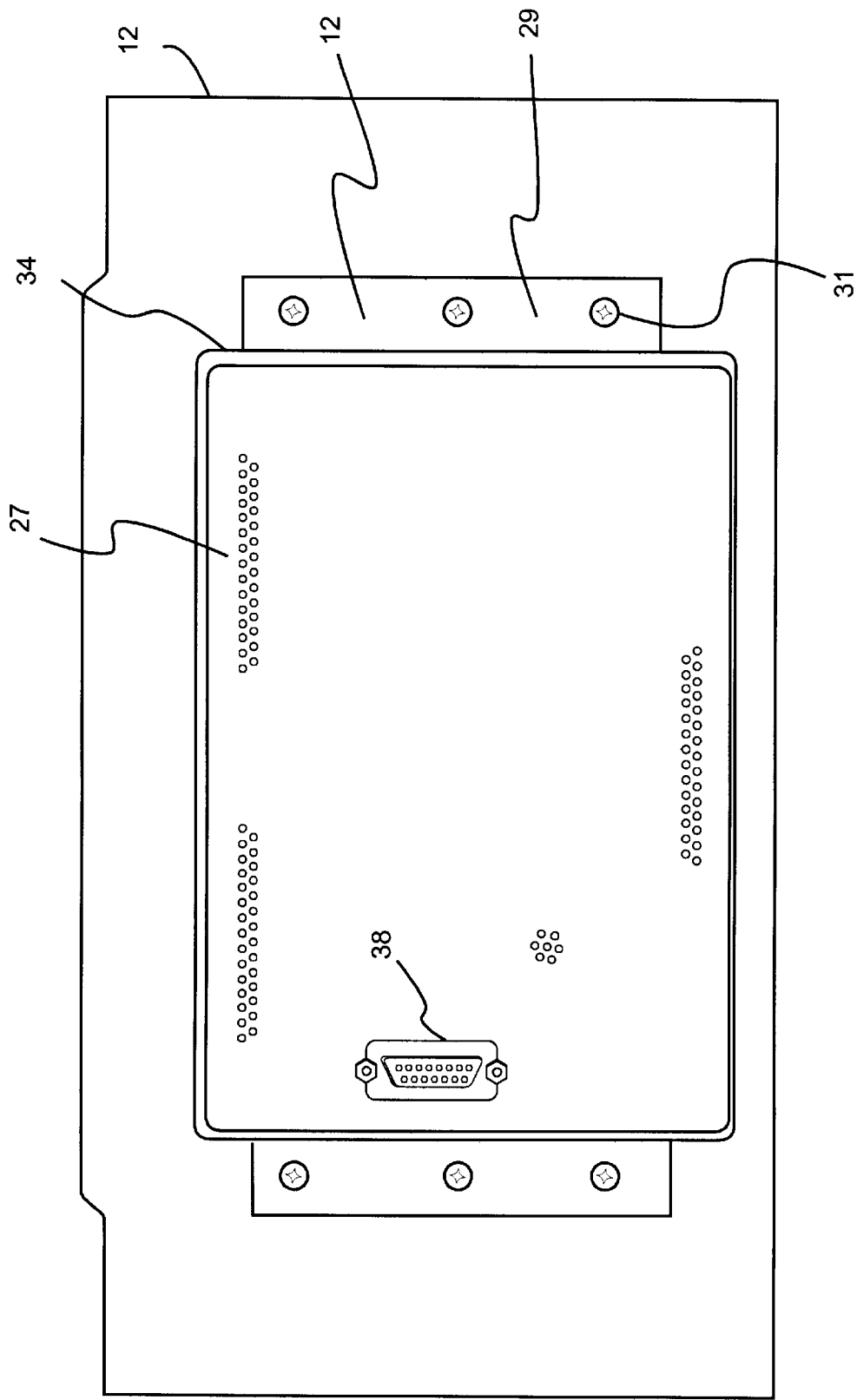
FIG. 7 is a rear elevation of the music rack.
Figure 8:
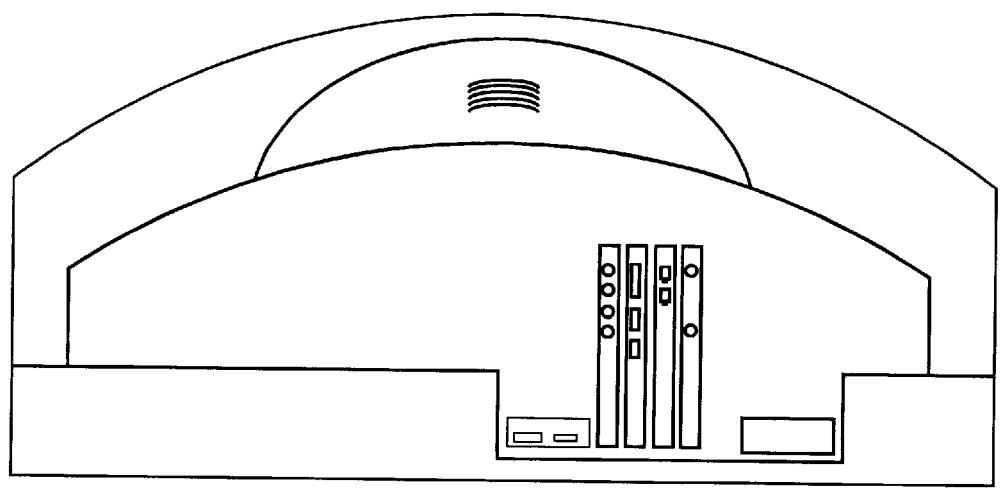
FIG. 8 is a side elevation of FIG. 1.
Figure 9:
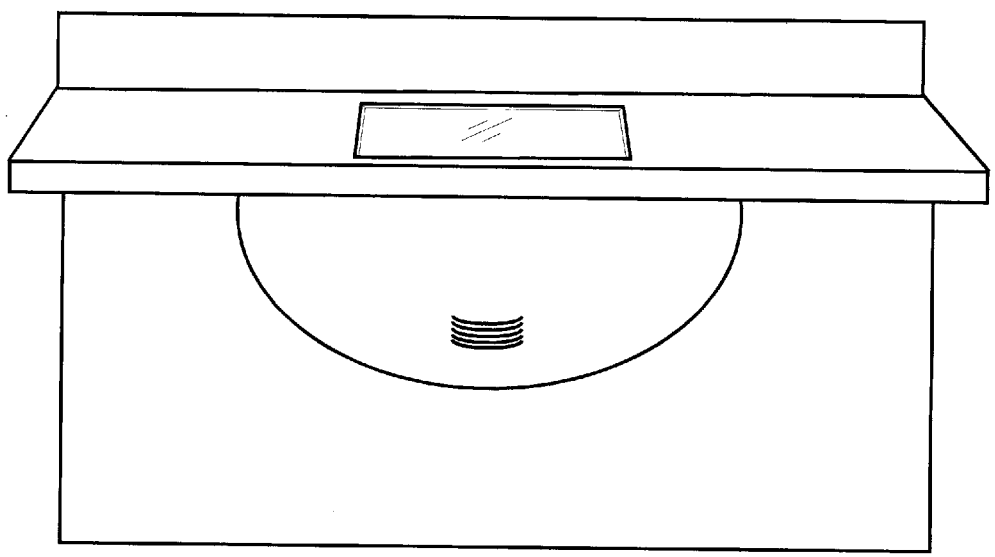
FIG. 9 is a rear elevation of FIG. 1.

Referring to FIGS. 6 and 7, a flat screen display 26 can be recessed in an opening 34 in the music stand 12. The flat screen display 26 can be contained within a display housing 27 with the display housing 27 attached to the music stand 12. Any means of connecting the display housing 27 to the music stand 12 is acceptable; however, the presently preferred means is a pair of L-brackets 29 and a set of screws 31. The display housing 27 preferably has a video port 38 that connects the flat screen display 26 to the computer system 20 and power supply 46 (not shown). The combination of the flat screen display 26 with the music stand 12 is also described in U.S. application Ser. No. 08/781,309, filed Jan. 15, 1997, which is incorporated herein by reference.

The graphical user interface can be used to control a variety of computer functions well known in the art and others that may be in development and yet to be developed. The computer system 20 used in the invention can operate to manage a variety of functions for the electronic musical instrument including receiving and processing signals, for example from a keyboard of an electronic synthesizer, and generating appropriate audio signals to be output by the sound system. The computer system 20 can further provide educational and informational programs output through the sound system and the video display 14. The computer system 20 can further retrieve digital information, including music information and educational information from the various digital sources to provide more advanced applications. The functions can be obtained through known computer configurations or through later developed systems yet still remain within the scope of the invention which relates more particularly to the integration of the touch responsive graphical user interface into the integrated music stand.

Figure 10:
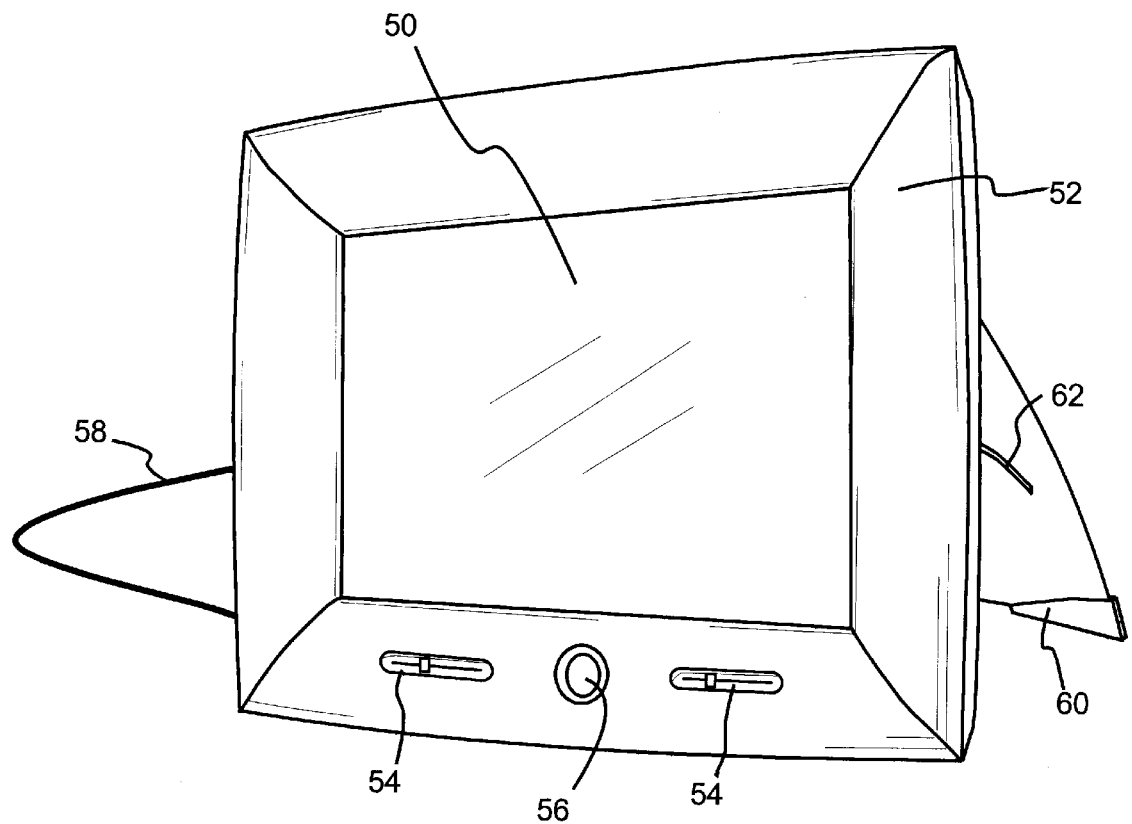
FIG. 10 is a front perspective view taken from the left of a modular housing for a graphical user interface and touch screen overlay for use in connection with the modular musical instrument system of the invention.
Figure 11:
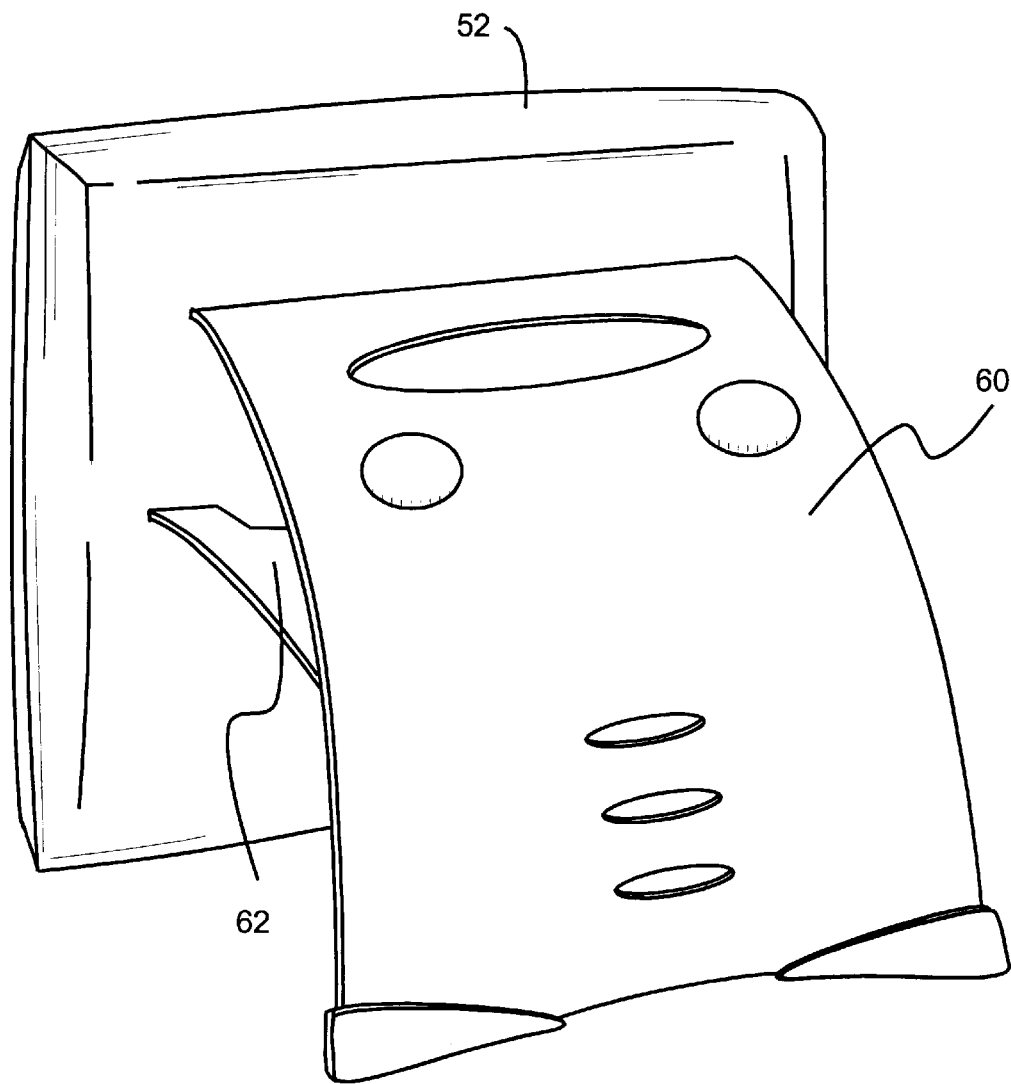
FIG. 11 is a rear perspective view taken from the left of the housing as shown in FIG. 10.

Referring generally to FIGS. 10 and 11, the graphical user interface 50 and touch screen overlay can be housed in a frame-like housing 52 providing a screen area as well as slidable controls 54 for such parameters as volume and balance and additionally providing a depressible button 56 for overall power or other electronic function. The touch screen interface housing 52 can provide a cable 58 for connecting to the computer-based control system of the musical instrument system (not shown). The housing 52 can be accompanied by a pivotal back support 60 that elevates the housing 52 in a vertical or angled configuration in easel-like manner. The back support 60 can be secured by a cross brace 62 that is likewise pivotally mounted to the back of the graphical user interface housing 52.

Figure 14:
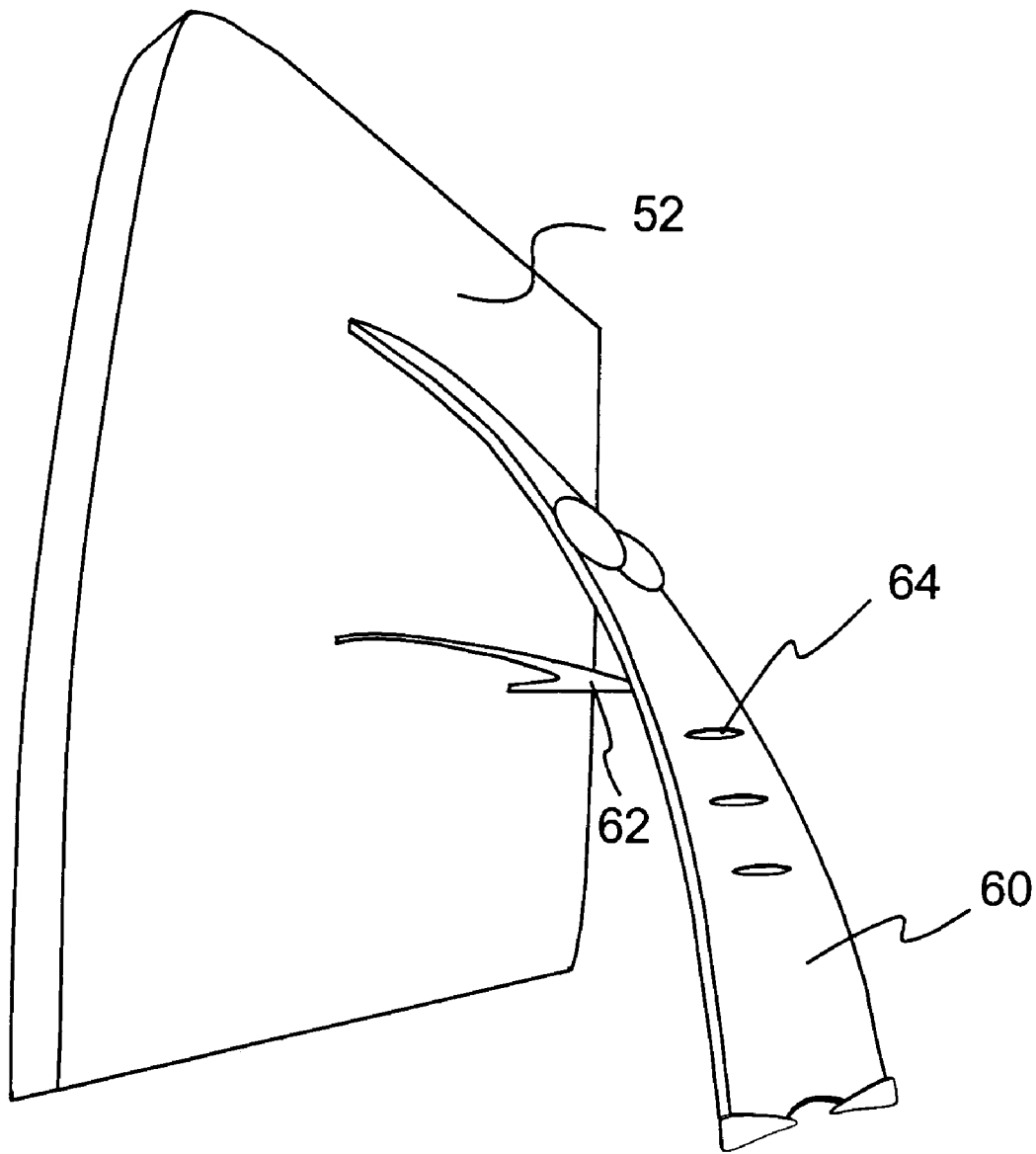
FIG. 14 is a rear perspective view as in FIG. 13 with a supporting strut pivoted to engage and secure the pivotal back support.

As shown in FIGS. 12–14, the pivotal back support 60 can be positioned in a closed position or an open, supporting position and the brace 62 can likewise be pivoted into an open supporting position and selectably mounted to one or more apertures 64 in the pivotal back support 60 for controlling the angle of the graphical user interface housing 52.

Figure 15:
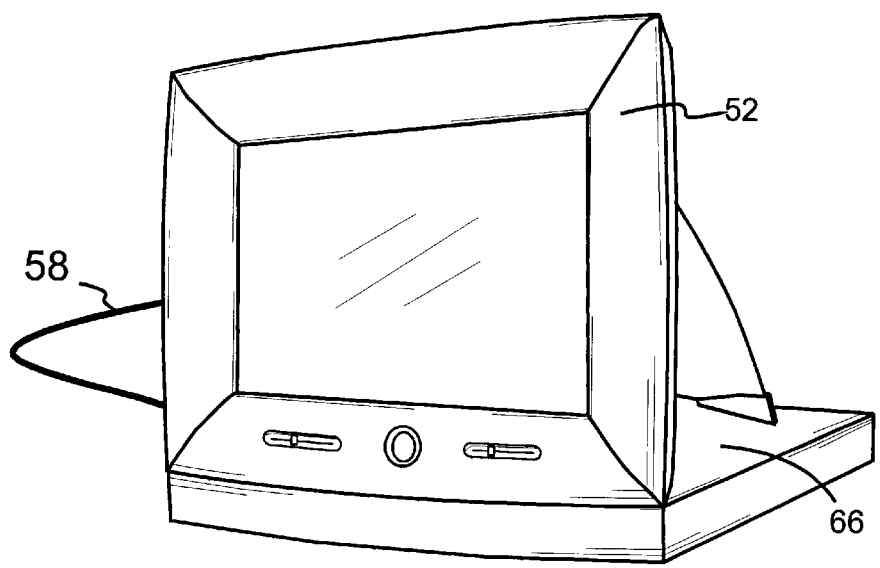
FIG. 15 is a front perspective view taken from the left of a housing for the graphical user interface and touch screen overlay mounted on a separate platform for housing drives related to the musical-instrument system.
Figure 16:
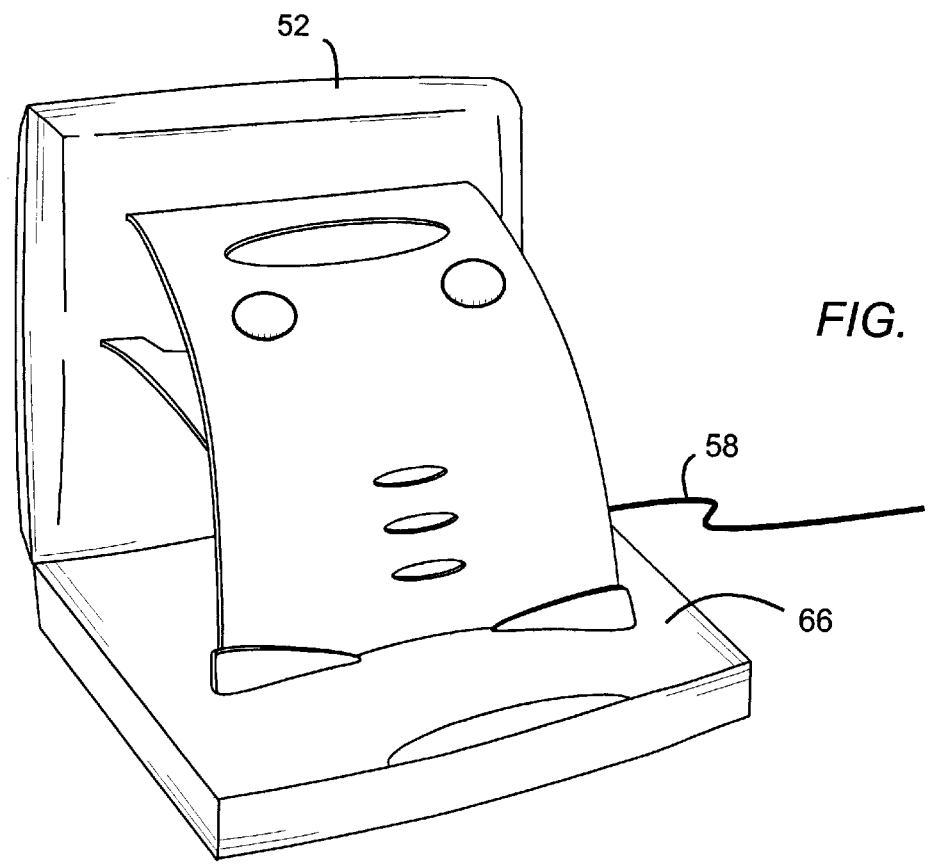
FIG. 16 is a rear perspective view taken from the left of the graphical user interface and associated platform as shown in FIG. 15.

As shown in FIGS. 15 and 16, the graphical user interface housing 52 can provide one modular component of the electronic musical instrument system and can be mounted on a generally horizontally extending platform 66 for housing, preferably drive, such as a floppy drive or disk drive (not shown). Again, a cabling 58 can be used to interface the modules to the electronics of the electronic musical instrument system.

Figure 17:
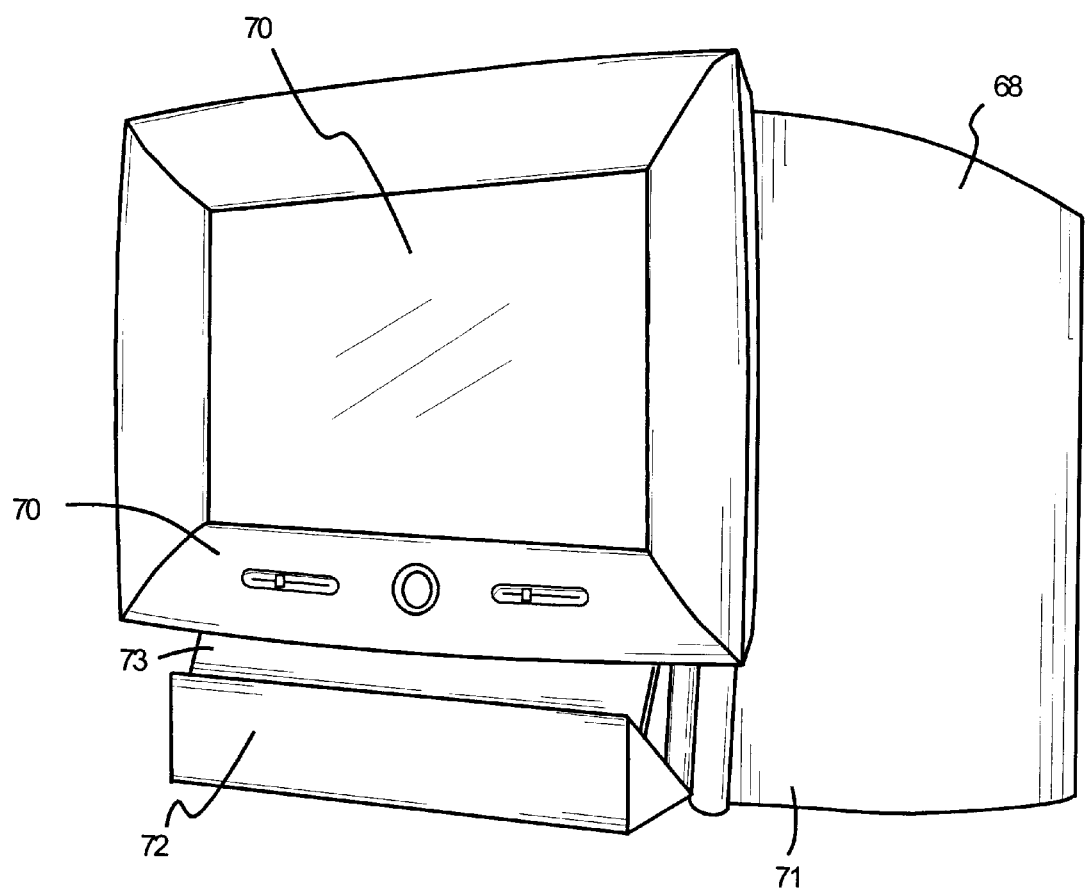
FIG. 17 is a front perspective view taken from the left of the graphical user interface and touch screen overlay housing mounted to a larger supporting housing for electronics for the musical instrument system.

As shown in FIG. 17, the electronics of the computer-based control system for the electronic musical instrument system can be placed in a larger housing 68 that provides along its front face 70 a pivotal base support 72 that opens to receive along a channel 71 the base 73 of the graphical user interface housing 75.

Figure 18:
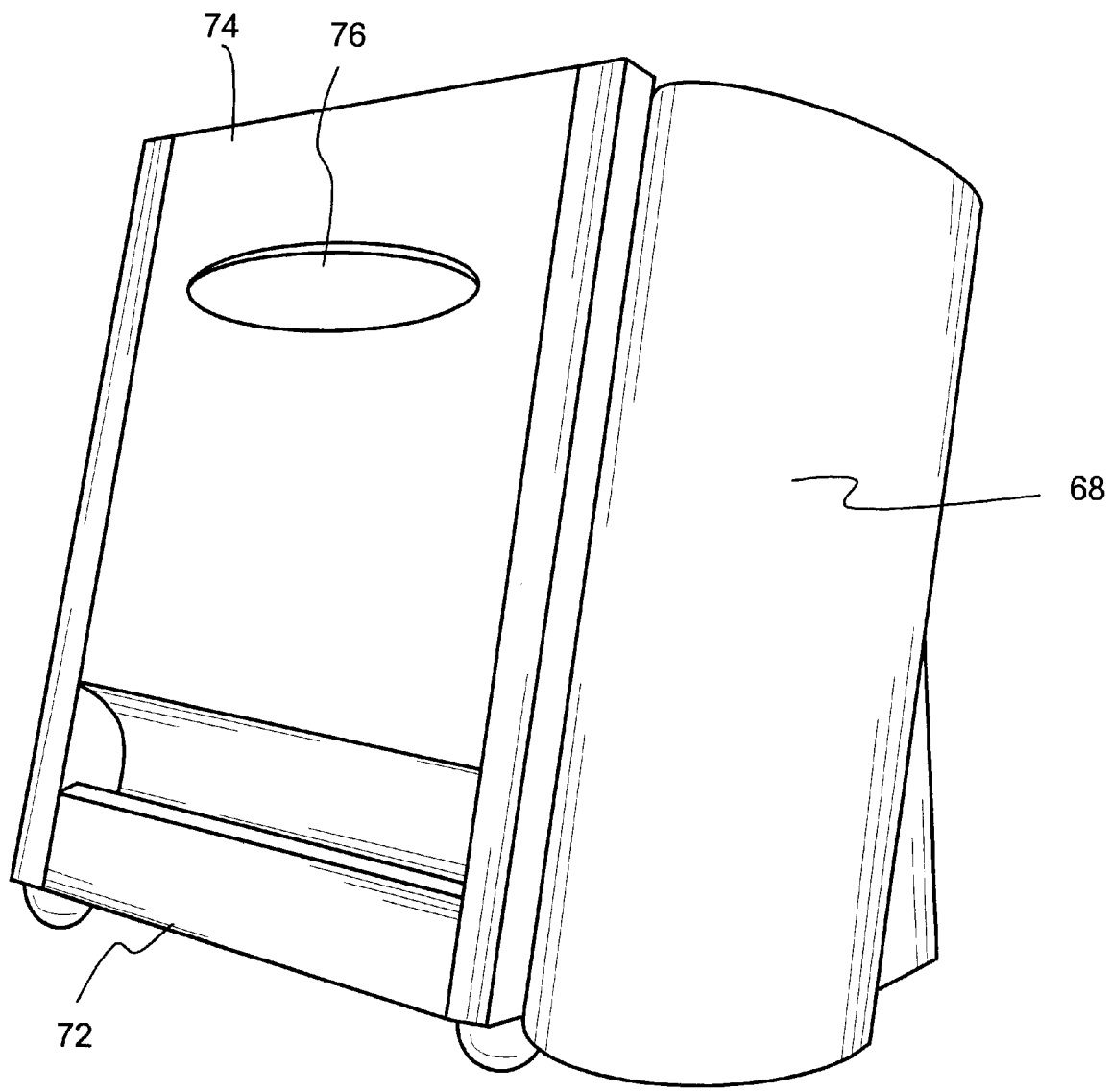
FIG. 18 is a front perspective view taken from the left of a housing for enclosure of electronics for the musical instrument system having a front supporting surface and pivotal base support for receiving the housing of the graphical user interface and touch screen overlay as shown in FIG. 17.
Figure 19:
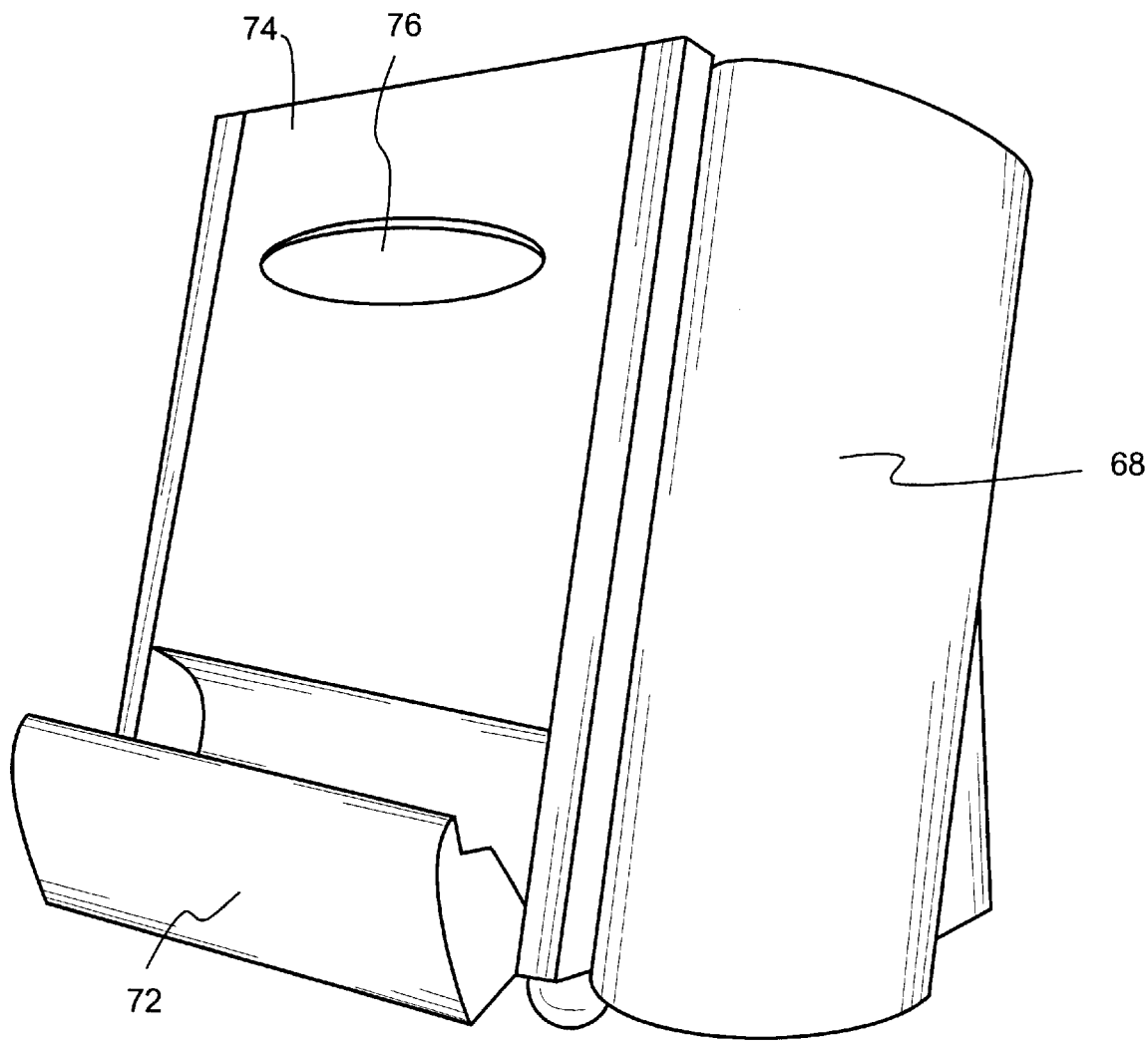
FIG. 19 is a front perspective view taken from the left of the housing of FIG. 18 with the pivotal supporting base in an open, receiving position.

FIGS. 18 and 19 illustrate the housing 68 for the computer-based control system for the musical instrument system without the graphical user interface housing present. FIG. 18 illustrates the pivotal base support 72 in a closed position, while FIG. 19 illustrates this base support 72 in an open position, prepared to receive the frame-like housing 75 of the graphical user interface 50. The front panel of the housing can include a preferably removable front plate 74 that includes an aperture 76 for routing cabling from the graphical user interface housing 75 into the internal area of the housing 68 for connection to the computer-based control system for the electronic musical instrument system.

Figure 20:
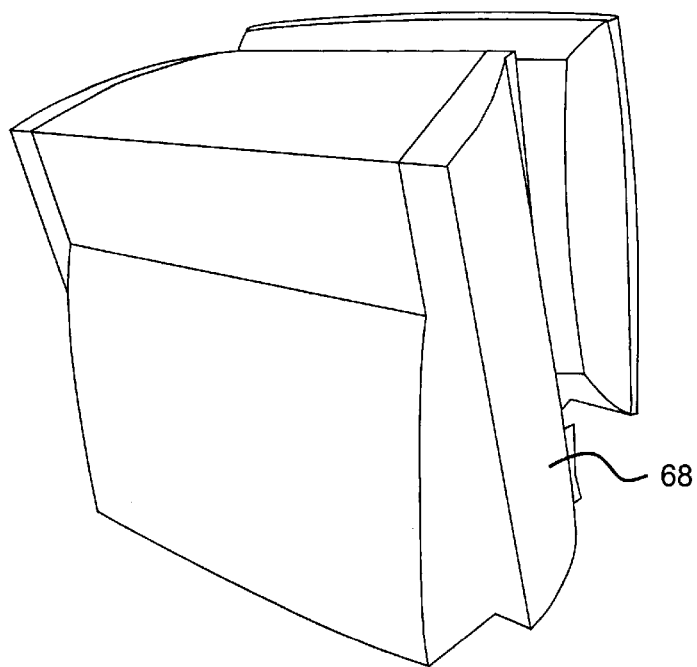
FIG. 20 is a rear perspective view taken from the right of the electronics housing with the graphical user interface mounted to the front thereof.
Figure 21:
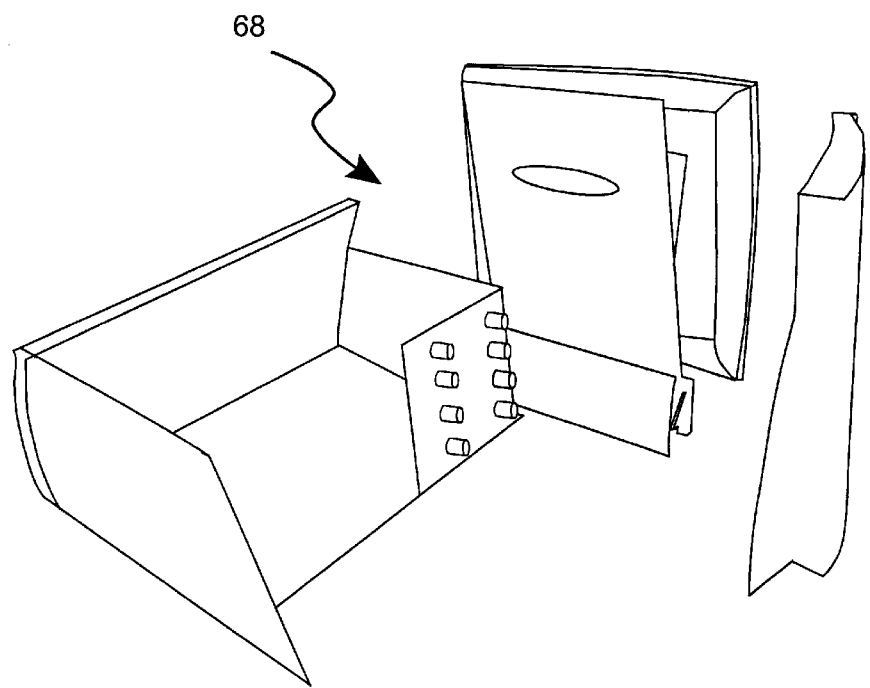
FIG. 21 is an exploded view of the electronics housing wherein the front support surfaces connected to the graphical user interface housing and a side wall is detached from the larger housing, the larger housing being rested on its rear surface for purposes of illustration.

FIG. 20 illustrates a rear view of the housing 68 for the computer-based control system for the musical instrument system. FIG. 21 is an exploded view illustrating the removability of side members of the larger housing 68 to enable user or service provider access to ports for connection to the componentry of the computer-based control system of the musical instrument system.

Figure 22:
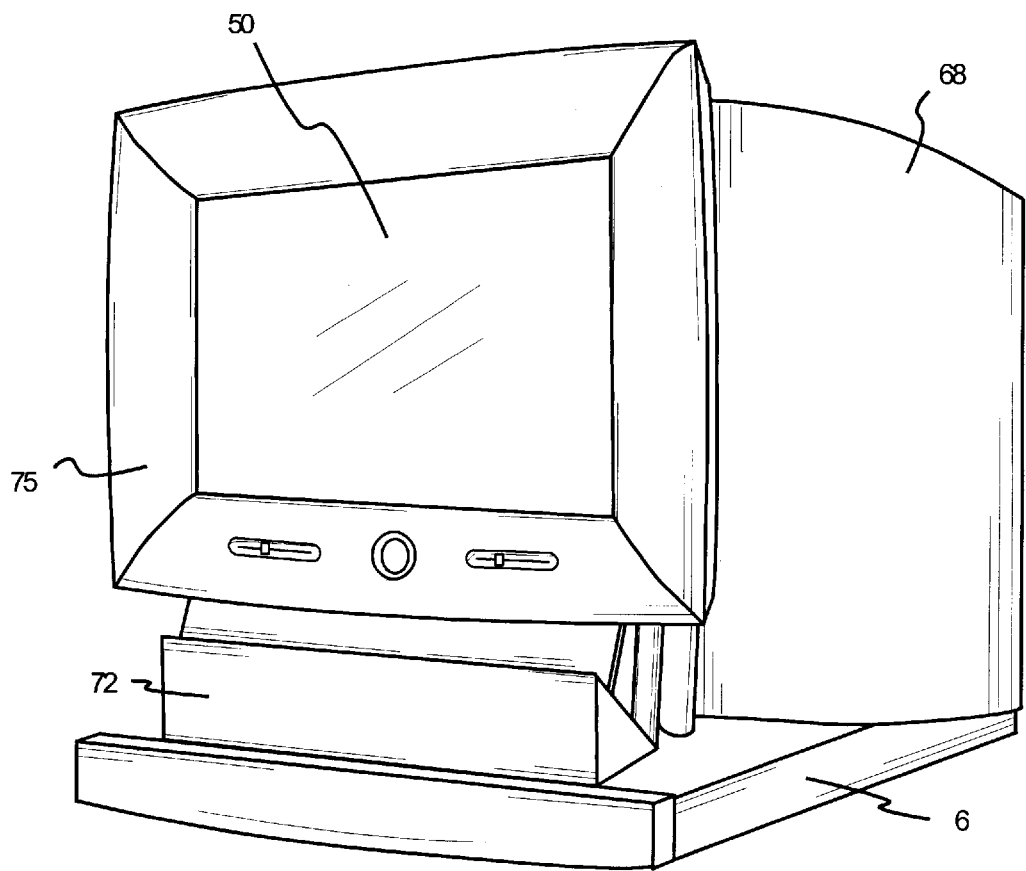
FIG. 22 is a front perspective view taken from the left of the graphical user interface housing mounted to the larger electronics housing and resting on the pivotal supporting base of the larger housing together with a modular attachment to the platform housing for drives.

FIG. 22 illustrates a complete combination of the preferred modules including the graphical user interface housing 75 mounted along the pivotal base support 72 of the larger housing 68 for the computer-based control system as well as the lower platform module 66 for housing disk and floppy drives (not shown).

Figure 23:
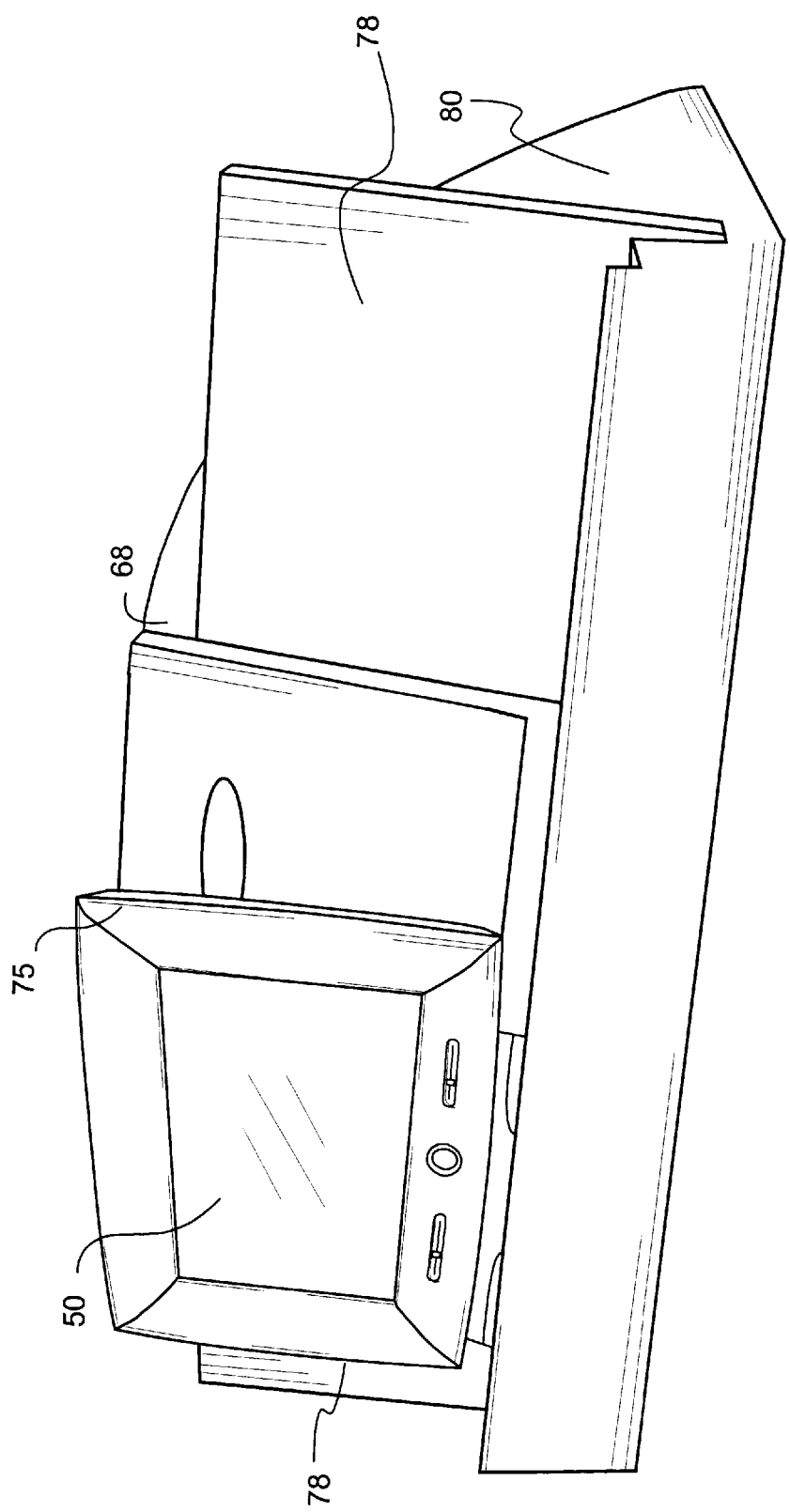
FIG. 23 is a front perspective view taken from the left of the modular combination as illustrated in FIG. 22 with the further addition of optional music stand side supports connected to the large electronic housing and providing a continuous railing between the side music stand supports and the modular graphical user interface housing.
Figure 24:
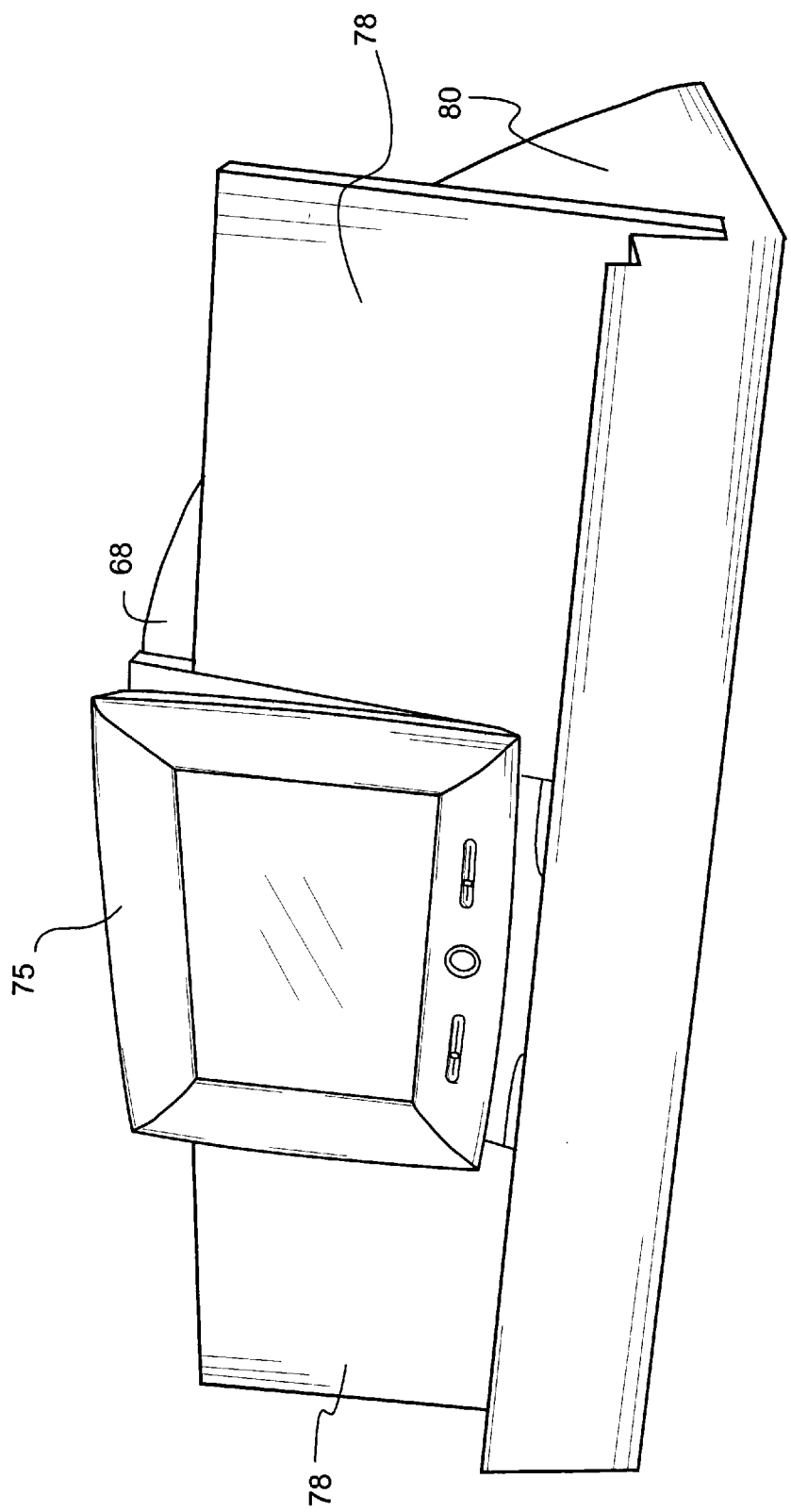
FIG. 24 is a front perspective view taken from the left of the combination shown in FIG. 23, illustrating the slidable positioning of the graphical user interface housing along the music stand railing.
Figure 25:
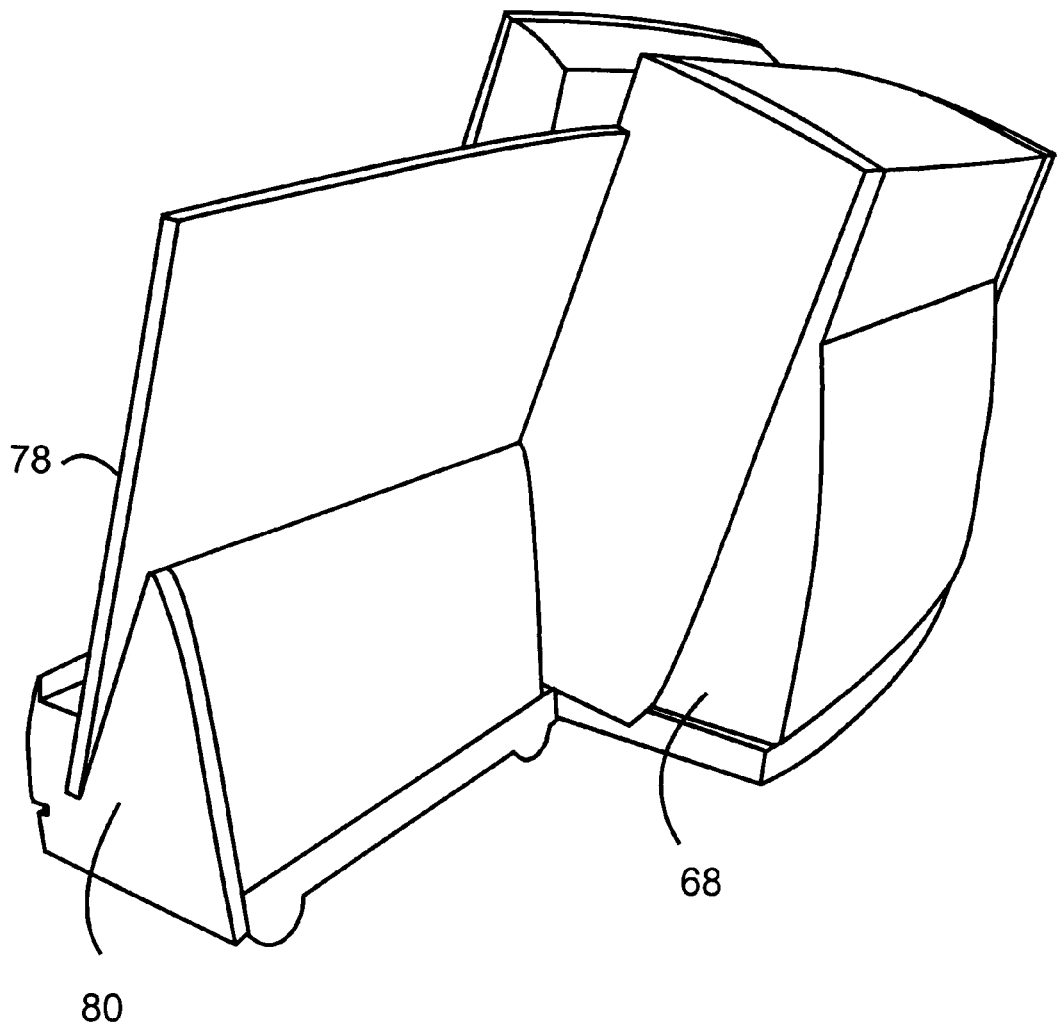
FIG. 25 is a rear perspective view taken from the left of the combination of FIG. 24 showing the rear construction of the side music stand support accessory.

Referring to FIGS. 23–25, the modular system can further include side members 78 providing music stand surfaces and railings 80 for the mounting of sheet music and other media appropriate for music stands. The railing 80 of the two side members connects to the pivotal base support 72 of the computer-based control system housing 68 to provide a continuous railing to serve as a music stand. Because the housing 75 of the graphical user interface is not in a preferred embodiment electrically mounted to the pivotal base mount, it is possible to slide or otherwise reposition the graphical user interface housing 75 along the railing 80 formed by the two side music stand members and the pivotal base support 72, thereby enabling the user to selectively position the location of the graphical user interface 50 along the top of the piano. FIG. 25 illustrates a rear view taken from the left of the complete preferred system, including the side music stand members 78.

Thus, an ergonomic and aesthetic integration of computer control in a music stand environment is provided. Details of various embodiments have been described, intending only to be examples. The scope of the invention should therefore be assessed by the accompanying claims in accordance with the law and not by a foregoing description.

What is claimed is:

1. An adaptable modular musical keyboard retrofit system comprising:

a computer base control system for converting music information into audio signals;

a display screen for displaying a graphical user interface through which a user can control said computer-based control system; and at least one bulk storage device for storing said music information, each of said control-system, display screen and bulk storage device housed separately from one another;

said control-system communicatively connected to said display screen and said bulk storage device;

said computer-based control system having connectivity means for communicatively connecting said computer-based control system to a digital piano having a musical keyboard and music synthesis means responsive to keystrokes applied to said musical keyboard;

said computer-based control system adaptable to receive digital keystroke information from said digital piano.

2. The adaptable modular musical keyboard retrofit system of claim 1, wherein said display comprises a touch-screen display responsive to the touch of a user.

3. The adaptable modular musical keyboard retrofit system of claim 2, wherein said touch-screen display comprises a flat touch-screen display.

4. The adaptable modular musical keyboard retrofit system of claim 2, wherein said touch-screen display comprises an LCD display responsive to the touch of a user.

5. The adaptable modular musical keyboard retrofit system of claim 2, wherein said touch-screen display comprises an CRT display responsive to the touch of a user.

6. The adaptable modular musical keyboard retrofit system of claim 2, wherein said touch-screen display is housed in a picture frame.

7. The adaptable modular musical keyboard retrofit system of claim 6, wherein said picture frame has pivotal back support.

8. The adaptable modular musical keyboard retrofit system of claim 1, wherein said bulk storage device comprises a fixed disk drive.

9. The adaptable modular musical keyboard retrofit system of claim 1, wherein said bulk storage device comprises a removable disk drive.

10. The adaptable modular musical keyboard retrofit system of claim 1, wherein said bulk storage device is an electronic memory.

11. The adaptable modular musical keyboard retrofit system of claim 8, wherein said fixed disk drive is a hard disk drive.

12. The adaptable modular musical keyboard retrofit system of claim 9, wherein said removable disk drive is an optical disk drive.

13. The adaptable modular musical keyboard retrofit system of claim 9, wherein said removable disk drive is a floppy disk drive.

14. The adaptable modular musical keyboard retrofit system of claim 9, wherein said retrofit system comprises at least two bulk storage devices housed together in a single housing.

15. The adaptable modular musical keyboard retrofit system of claim 14, wherein at least one of said bulk storage devices is a removable disk drive.

16. The adaptable modular musical keyboard retrofit system of claim 15, wherein said bulk storage device comprises a removable disk drive.

17. The adaptable modular musical keyboard retrofit system of claim 16, wherein said removable disk drive is an optical disk drive.

18. The adaptable modular musical keyboard retrofit system of claim 16, wherein said removable disk drive is a floppy disk drive.

19. The adaptable modular musical keyboard retrofit system of claim 16, wherein at least one of said bulk storage devices is an optical disk drive and at least one of said bulk storage devices is a floppy disk drive.

20. The adaptable modular musical keyboard retrofit system of claim 1, wherein said computer based control system comprises communications circuitry.

21. The adaptable modular musical keyboard retrofit system of claim 20, wherein said communications circuitry is a modem.

22. The adaptable modular musical keyboard retrofit system of claim 20, wherein said communications circuitry is an input/output device.

23. The adaptable modular musical keyboard retrofit system of claim 1, wherein said bulk storage device is positioned below said musical keyboard.

24. The adaptable modular musical keyboard retrofit system of claim 1, wherein said bulk storage device is positioned above said musical keyboard.

25. The adaptable modular musical keyboard retrofit system of claim 1, wherein said display screen is positioned on a piano above said musical keyboard.

26. The adaptable modular musical keyboard retrofit system of claim 1, wherein said display screen is positioned on a music stand above said musical keyboard.

27. The adaptable modular musical keyboard retrofit system of claim 25, wherein said display screen is manually selectably positionable at a plurality of locations on a top surface of said piano.

28. The adaptable modular musical keyboard retrofit system of claim 26, wherein said display screen is manually selectably positionable at a plurality of locations on said music stand.

29. The adaptable modular musical keyboard retrofit system of claim 25, wherein said control system is removeably mounted to a bottom surface of said piano housing.

30. The adaptable modular musical keyboard retrofit system of claim 25, wherein said bulk storage device is removeably mounted to a bottom surface of said piano housing.

* * * * *

UNITED STATES PATENT AND TRADEMARK OFFICE
CERTIFICATE OF CORRECTION

PATENT NO. : 6,218,602 B1
DATED : April 17, 2001
INVENTOR(S) : Davis et al.

It is certified that error appears in the above-identified patent and that said Letters Patent is hereby corrected as shown below:

<u>Column 8, claim 1,</u>
Line 37, change "computer base" to -- computer-based --.

Signed and Sealed this

Nineteenth Day of March, 2002

Attest:

JAMES E. ROGAN
*Director of the United States Patent and Trademark Office*

*Attesting Officer*